United States Patent
Song et al.

(10) Patent No.: US 7,378,118 B2
(45) Date of Patent: *May 27, 2008

(54) METHODS FOR MANUFACTURING COATED CONFECTIONARY PRODUCTS

(75) Inventors: Joo Hae Song, Chicago, IL (US); Choongil Kim, Naperville, IL (US); George Lorenz, Downers Grove, IL (US); Henry Valdez, Oak Lawn, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 1017 days.

This patent is subject to a terminal disclaimer.

(21) Appl. No.: 10/218,991

(22) Filed: Aug. 14, 2002

(65) Prior Publication Data

US 2004/0033288 A1    Feb. 19, 2004

(51) Int. Cl.
    *A23G 3/54*    (2006.01)
(52) U.S. Cl. .................. 426/103; 426/303; 426/304; 426/307
(58) Field of Classification Search ............. 426/3–6, 426/103, 302–304, 307
    See application file for complete search history.

(56) References Cited

U.S. PATENT DOCUMENTS

| | | | |
|---|---|---|---|
| 3,477,858 A | 11/1969 | Wells et al. | |
| 3,556,814 A | 1/1971 | Whitman et al. | |
| 3,671,266 A | 6/1972 | Cooper et al. | |
| 4,105,801 A | 8/1978 | Dogliotti | |
| 4,127,677 A * | 11/1978 | Fronczkowski et al. | 426/5 |
| 4,146,653 A | 3/1979 | Mader et al. | |
| 4,146,656 A | 3/1979 | Kinugawa et al. | |
| 4,235,458 A | 11/1980 | Austin et al. | |
| 4,293,570 A * | 10/1981 | Vadasz | 426/3 |
| 4,328,249 A | 5/1982 | Mackay et al. | |
| 4,828,845 A * | 5/1989 | Zamudio-Tena et al. | 426/5 |
| 4,840,797 A | 6/1989 | Boursier | |
| 4,937,080 A | 6/1990 | Appelgren et al. | |
| 5,270,061 A * | 12/1993 | Reed et al. | 426/5 |
| 5,314,701 A * | 5/1994 | Mentink et al. | 426/103 |
| 5,376,389 A * | 12/1994 | Reed et al. | 426/5 |
| 5,958,471 A * | 9/1999 | Schwarz et al. | 426/3 |
| 5,965,181 A * | 10/1999 | Barkalow et al. | 426/103 |
| 6,365,203 B2 | 4/2002 | Degady et al. | |
| 6,506,424 B2 * | 1/2003 | Nielsen et al. | 426/5 |
| 6,558,692 B2 * | 5/2003 | Ream et al. | 424/440 |
| 6,627,233 B1 * | 9/2003 | Wolf et al. | 426/3 |
| 6,696,044 B2 * | 2/2004 | Luo et al. | 424/48 |

FOREIGN PATENT DOCUMENTS

| | | |
|---|---|---|
| EP | 0 670 680 A1 * | 3/1999 |
| EP | 1057414 | 6/2000 |
| GB | 1247979 | 9/1971 |
| WO | WO8101100 | 4/1981 |
| WO | WO 01/56398 A1 * | 8/2001 |
| WO | WO2004008877 | 1/2004 |
| WO | WO2004016093 | 2/2004 |
| WO | WO2006071343 | 7/2006 |

* cited by examiner

*Primary Examiner*—Drew Becker
(74) *Attorney, Agent, or Firm*—Bell, Boyd & Lloyd LLP

(57) ABSTRACT

Improved coatings and methods for manufacturing coated confectionary or chewing gum products are provided. Polyol coatings can be formed while polyols are in a molten state. Trehalose can also be used to form coatings on a confection or chewing gum by applying the trehalose while in a molten state.

23 Claims, 1 Drawing Sheet form a chewing gum center 10 → heat polyol to its melting point 12 → apply molten polyol to chewing gum center to form a coating 14

METHODS FOR MANUFACTURING COATED CONFECTIONARY PRODUCTS

BACKGROUND OF THE INVENTION

The present invention relates generally to confectionary products. More specifically, the present invention relates to confectionary products that have an outer coating.

There are numerous types of confectionary products for consumers. One such confectionary product is chewing gum. Chewing gum generally consists of a water insoluble portion and a water soluble portion including sweeteners.

In a similar vein, it is known to provide a variety of different types of chewing gum. For example, it is known in creating chewing gum, and other confectionary products, to coat the chewing gum with an outer coating. The coating can provide an initial sweetness or other desirable oleptic property to the consumer. Further, the coating can provide a crunching sensation when chewed by the consumer. A number of such chewing gum products are known.

Initially, in creating coated chewing gums, sugar syrups or similar solutions were used to create the coating. Solutions, which may be in a liquid state at high temperature, contain a water component wherein the solute is dissolved or suspended. The coating is often achieved by spraying the hot solution onto the base confectionary item, which cools the coating solution allowing it to solidify, then drying the coating.

Despite their widespread popularity in the confectionary industry, conventional solution-based coatings, such as sugar syrups, are in some ways disadvantageous. For example, an adequately thick coating typically cannot be achieved with a single spray application. Therefore, repeated cycles of spraying and drying are required to achieve a final coating that is sufficiently thick. The repeated spraying and drying process is complicated by the fact that drying each application typically requires the introduction of hot, dry air to remove moisture before spraying the next coat. This is due to the fact that solutions-based coatings have a moisture content that provides for the liquid property of the solution. This liquid characteristic is necessary for the coating solution to be sprayed or otherwise conveniently applied to the confectionary item. Of course, however, the moisture component must be removed after application in order for the coating to be transformed to a solid state.

These repeated cycles of spraying and drying are time-consuming and require specialized equipment. Indeed, elimination of the drying steps, for example, the use of hot, dry air, could reduce capital and energy expenditures associated with the equipment necessary to the drying process. Additionally, time and energy could be saved if a confectionary coating could be developed that requires fewer (and preferably, only one) spray applications in order to achieve an adequate coating thickness.

In recent years, polyol solutions have been used for coating confections, including chewing gums, as an alternative to sugar-based solution coatings. Xylitol and other polyol solutions, however, are similar to conventional sugar solutions in that they require repeated cycles of application and drying to remove the inherent water component contained therein.

There is therefore a need for improved coatings for chewing gums and other confections. More specifically, it would be beneficial if polyols and other coating substances could be formulated such that their use as confectionary coatings could be achieved in a more expeditious and cost-effective manner.

SUMMARY OF THE INVENTION

The present invention provides for improved coated confectionary products as well as methods for coating confectionary products.

To this end, in an embodiment, the present invention provides for a method of manufacturing a confectionary product comprising a confectionary center. The method includes the steps of heating a polyol to its melting point such that it liquefies and becomes molten, and coating the confectionary center by preferably atomizing the molten polyol and spraying it onto the center.

In an embodiment, the molten polyol can include xylitol, maltitol, sorbitol, erythritol, mannitol, isomalt, lactitol and combinations thereof.

In an embodiment, the preferred molten polyol is xylitol or sorbitol.

In an embodiment, the coating step is performed without the use of hot or dry air to cause the coating to harden.

In an embodiment, the coating is substantially free of moisture during the coating process, e.g., less than 5% by weight.

In a further embodiment, the confectionary product is a chewing gum center.

In a further embodiment, the present invention provides for a method of manufacturing a chewing gum product comprising a chewing gum center. The method includes the steps of heating a polyol to its melting point such that it liquefies and becomes molten, and coating the gum center with the molten polyol.

In an embodiment, the molten polyol is applied directly to the chewing gum center.

In an embodiment, xylitol or sorbitol is the only polyol contained in the coating.

In an embodiment, the method includes placing multiple molten polyol coatings around the center.

In an embodiment, the molten polyol coating includes non-polyol ingredients.

In a further embodiment, the molten polyol forms a first coating around a chewing gum center, and a second coating is formed that includes a molten polyol, polyol syrup, or sugar syrup that substantially surrounds the first coating.

In an embodiment, the molten polyol is applied by an atomizing spray application.

In a further embodiment, the present invention provides for a method of manufacturing a chewing gum product comprising a chewing gum center. The method includes the steps of forming a chewing gum center and coating with an atomizing spray that substantially surrounds the gum center, the coating comprising a molten polyol.

In an embodiment, the molten polyol coating is sprayed with an atomizing nozzle over a previously applied coating that was applied while in a non-molten state.

In still a further embodiment, the present invention provides for a method of manufacturing a confectionary product comprising a confectionary center. The method includes the step of coating the confectionary center with a layer of other sugar or sugarless materials that are non-degrading with good heat stability, preferably with lower melting points, such as dextrose or trehalose.

In various embodiments, the present invention provides for compositions that are produced by the various methods embodied herein.

It is an advantage of the present invention to provide improved coatings for confectionary products as well as improved methods for forming such coatings.

It is an advantage of the present invention to provide improved methods for manufacturing chewing gum products.

It is an advantage of the present invention to provide coating substances that can be sprayed onto confectionary items.

Moreover, it is an advantage of the present invention to provide improved methods for applying coatings to an edible product including a center.

It is another advantage of the present invention to provide coatings and methods for applying same that require fewer processing steps.

It is an advantage of the present invention to provide improved coated products including chewing gum.

Additional features and advantages of the present invention are described in, and will be apparent from, the following Detailed Description of the Invention and the Figures.

DETAILED DESCRIPTION OF THE INVENTION

Figure 1:
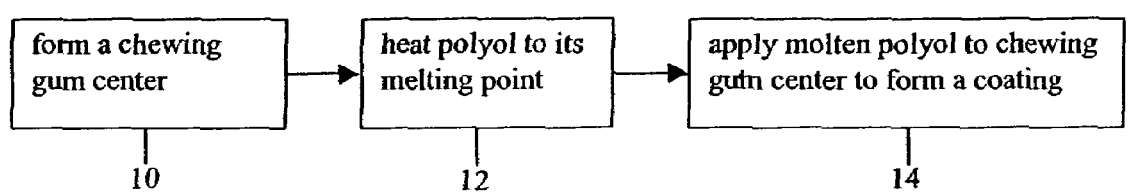
FIG. 1 illustrates a schematic view of the process steps of an embodiment of the present invention.

The present invention provides for improved coated confectionary products as well as methods for coating confectionary products. Although in the preferred embodiments set forth below the confectionary product is chewing gum, the present invention is not limited to chewing gum. The present invention can be used to coat foodstuffs and most preferably confectionary products, including chewing gum.

The present invention generally provides for the use of molten polyols and other molten substances to coat confectionary products, and more specifically, chewing gum. In the case of chewing gum, for example, the molten polyol coating is typically applied to chewing gum centers. Pursuant to the present invention, time, energy, and equipment costs are reduced due to the reduction and/or elimination of the need to perform repeated cycles of spraying and drying of the coating substance. In this regard, the molten polyol coatings of the present invention can be applied in single spray application without the need for drying involving the introduction of hot, dry air. However, more than one coating application can be used.

The molten polyols of the present invention can reduce or eliminate the need for repeated cycles of spraying and drying because the molten polyols do not possess the high water content found in conventional non-molten coating substances. In this regard, the polyols featured herein can be liquified by the introduction of sufficient heat levels, rather than by the introduction of moisture. In other words, when sufficiently heated, a given polyol will melt and will remain in a molten state until it is allowed to cool to a temperature below its melting point. The molten polyols of the present invention are to be applied, preferably by atomizing spray application, to the gum center while the polyols are in a molten state. Thereafter, the coated gum is allowed to cool, a process that enables the polyol to transform from a molten state back to a solid state.

The presently preferred polyol for use in the present invention is xylitol. However, other polyols can be used with the present invention. For example, other such suitable polyols include, but are not limited to, maltitol, sorbitol, erythritol, mannitol, isomalt, lactitol and combinations thereof. Xylitol is preferred because it possesses a relatively low melting point and is relatively less sticky as it cools. Sorbitol is also a preferred polyol due to its reduced cost as compared to xylitol.

The molten polyol coatings of the present invention may include non-polyol ingredients which are commonly used in sugar and sugarless coatings. The specific ingredients and their usage levels will vary greatly according to the intentions for the formulation. The use of one or more fillers (e.g., titanium dioxide, talc, calcium carbonate, silicon dioxide) in the present invention is especially advantageous. In this regard, these inorganic materials aid the coating process by giving the molten polyol coatings a smoother finish, especially when using molten polyols having a higher melting point, such as maltitol. Furthermore, these inorganic fillers enhanced the ease with which molten sorbitol could be used, and in many instances substantially increased the crunchiness of the product. Without adding an inorganic filler to molten sorbitol, the coating is excessively sticky, causing coating problems, e.g., the pellets may stick together. Likewise, without inorganic filler added to molten maltitol, the spray exiting the nozzle is unsuitable for coating smooth pellets. Moreover, the use of non-polyol can reduce the spider-web structures created by spraying maltitol.

As noted above, a suitable final molten polyol coating can typically be achieved with comparatively few spray applications. If desired, a number of short spray sessions can be performed. The final thickness of the polyol coating will vary greatly according to the preference of the practitioner of the present invention. For example, it may be desirable to have a thin coating or, on the other hand, it may be desirable to have a thick coating. In an embodiment, the coating is such that it exceeds 50% by weight of the total product. However, a thinner coating can be used if desired.

Various polyols may not be identical in their physical and chemical characteristics. The variability among the polyols therefore allows one to blend two or more different molten polyols prior to application. Similarly, it may be desirable to build-up multiple coating layers using single or blended polyols for the individual coating layers.

Molten polyol coatings can result in a finished product that, when compared to conventional non-molten coatings, is rougher in appearance. As used herein, the term "conventional non-molten coatings," and like terms, are intended to broadly refer to any coating substance that is not in a molten state, but dissolved or dispersed in an aqueous media, and applied to a given confectionary item. A non-molten coating substance can include, but is not limited to, sugar syrups, polyol syrups, other solutions, suspensions, pastes, and gels.

It should be noted that xylitol or sorbitol, whose melting point is below 100° C. (point where water boils) can be made less viscous by the addition of a small amount of water. Other polyols melt at temperatures above 100° C., and may be made less viscous with addition of small amounts of water. However, small amounts of water will evaporate when these polyols are heated.

Glycerin behaves similar to water. By introducing a small amount of glycerin, the temperature necessary to achieve a fluid state can be reduced. Glycerin's boiling point is 125.5° C. Thus, a small amount of glycerin can be used to melt erythritol (melting point of 121.5° C.) at a lower temperature than the crystal melting temperature. By adding small amounts of water or glycerin, the viscosity of the molten polyol is lower and allows for easier spraying or atomization.

Because molten polyol coatings can appear and feel rough to the consumer, it may be desirable to first coat the product with one or more molten polyol coatings, and then complete the coating process by using one or more conventional non-molten coatings in order to provide a final product with a smooth surface.

Additionally, it may be desirable to initially establish at least one coating layer using at least one conventional non-molten coating, over which at least one molten polyol coating of the present invention may be applied. Similarly, depending on the desired outcome, it may be preferable to employ alternating layers of molten polyol coatings and conventional non-molten coatings. Therefore the molten polyol coatings described herein can be utilized as the sole coating or can be utilized in combination with one or more other coating layers that comprise any type of conventional non-molten coating.

The molten polyol coatings of the present invention can be melted by methods known in the art. By way of example and not limitation, the coating materials can be melted by using a hotmelt apparatus such as the Robatech Hotmelt Unit. However, other means can be used.

Preferably, a jacketed atomizing spray nozzle is used. The jacketed atomizing sprayer will maintain the temperature of the molten polymer. Then, atomization will assist in cooling down the temperature of the molten polyol droplets before they hit the centers (pellets). After the coating material is transformed into a molten state, it can be applied to gum centers using processes, techniques, and equipment suited for the application of conventional non-molten coatings.

In an embodiment, the polyol is liquefied by heating a composition that includes 5% or less water.

Furthermore, as noted previously, it may be desirable to provide chewing gum products that have different coating layers comprising molten polyols and conventional non-molten coatings. In this regard, both such coating types can be applied using methods known in the art, such as spraying the coating materials onto the gum pellets. Spraying can be alternately started and stopped to allow layers of coating to dry onto the surface of the pieces. Forced air and dry powder additionally may be used to speed the drying process. The various parameters of the operation (spray time, dry time, air temperature, tumbling speed and others) will vary greatly from one system to another and may well vary within a coating batch and from batch to batch. They will be set based on the skill and experience of the developer and operator. Typical coating equipment usable in the present invention will include any suitable apparatus normally used for this purpose, with the exception of the spray nozzles, which must be atomizing nozzles to spray the molten polyol. Simple systems may comprise conventional motor-driven coating pans with manually controlled spray nozzles and drying air. However, more sophisticated automated systems such as Driam and Dumoulin Coaters are preferred.

The inventors of the present invention also see use for this invention with other sugars that do not burn when heated to their melting point, e.g. trehalose, dextrose, etc.

In addition to the coatings of the present invention applied by spraying, optionally flavors may be separately sprayed onto the pieces during the coating process to provide a flavored coating. If used, this flavor may constitute from about 0.01 to 3% of the total coating with levels of 0.5 to 2% being preferred.

Optionally a final polishing coat may be applied to the pieces after the polyol coatings have been applied. The polishing coat may use a wax, such as carnauba wax, or shellac. It may also include fillers such as talc and colors. The polishing coat is typically 0.1 to 0.5% of the total coating.

FIG. 1 illustrates a schematic view of the process steps of an embodiment of the present invention. As illustrated in a first step 10 a center is formed. In a second step 12 a polyol is heated to its melting point. In the third step 14 the polyol is applied to the gum center.

Figure 2:
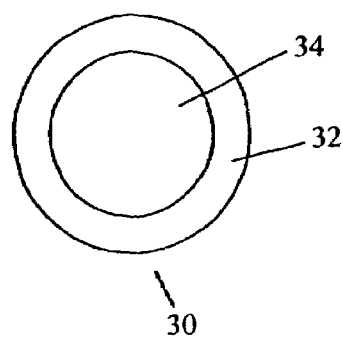
FIG. 2 illustrates a cross-sectional view of an embodiment of a product of the present invention.

As noted above, the present invention can be used to create coated chewing gum. FIG. 2 illustrates such a product 30. The product 30 includes a coating 32 and gum center 34. A variety of chewing gum formulations can be used to create the chewing gum center 34. Chewing gum generally consists of a water insoluble gum base, a water soluble portion, and flavors.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, for polyvinyl; acetate, 10,000 to 65,000 GPC weight average molecular weight with the higher molecular weight polyvinyl acetates typically used in bubble gum base, and for vinyl acetate-vinyl laurate, vinyl laurate content of 10-45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing the preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

The softeners, which are also known as plasticizers and plasticizing agents, generally constitute between approximately 0.5 to about 15% by weight of the chewing gum. The softeners may, in addition to including caprenin, include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, lactitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

A variety of processes for manufacturing chewing gum center are possible as is known in the art.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time, along with syrup and a portion of the bulking agent. Further portions of the bulking agent may then be added to the mixer. A flavoring agent is typically added with the final portion of the bulking agent. The entire mixing procedure typically takes from five to fifteen minutes, but longer mixing times may sometimes be required. Those skilled in the art will recognize that many variations of the above described procedures may be followed.

Once formed, the chewing gum center can be coated. In conventional panning, the coating is initially present as a liquid syrup which contains from about 30% to about 80% or 85% of the coating ingredients previously described herein, and from about 15% or 20% to about 70% of a solvent such as water. In general, the coating process is carried out in conventional panning equipment. Sugarless gum center tablets to be coated are placed into the panning equipment to form a moving mass.

In the conventional panning process, the material or syrup which will eventually form the coating is applied or distributed over the gum center tablets. Flavors may be added before, during and after applying the syrup to the gum centers. Once the coating has dried to form a hard surface, additional syrup additions can be made to produce a plurality of coatings or multiple layers of coating.

In the conventional panning procedure, syrup is added to the gum center tablets at a temperature of from about 100° F. to about 240° F. Preferably, the syrup temperature is from about 140° F. to about 200° F. Most preferably, the syrup temperature should be kept constant throughout the process in order to prevent the polyol in the syrup from crystallizing. The syrup may be mixed with, sprayed upon, poured over, or added to the gum center tablets in any way known to those skilled in the art.

In some instances, a soft coating is formed by adding a powder coating after a liquid coating. The powder coating may include natural carbohydrate gum hydrolysates, maltodextrin, gelatin, cellulose derivatives, starches, modified starches, sugars, sugar alcohols, natural carbohydrate gums and fillers like talc and calcium carbonate.

Each component of the coating on the gum center may be applied in a single layer or in a plurality of layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center. More preferably, less than about 60 coats are applied and most preferably, about 30 to 60 coats are applied. In any event, the present invention contemplates applying an amount of molten polyol and syrup sufficient to yield a coated chewing gum product containing about 10% to about 65% coating. Preferably, the final product will contain at least 30% coating.

Those skilled in the art will recognize that in order to obtain a plurality of coated layers, a plurality of premeasured aliquots of coating syrup may be applied to the gum center. It is contemplated, however, that the volume of aliquots of syrup applied to the gum center may vary throughout the coating procedure.

In the conventional coating process, once a coating of syrup is applied to the gum center, drying is done on the wet syrup in an inert medium. A preferred drying medium comprises air. Preferably, forced drying air contacts the wet syrup coating in a temperature range of from about 70° F. to about 110° F. More preferably, the drying air is in the temperature range of from about 80° F. to about 100° F. The invention also contemplates that the drying air possess a relative humidity of less than about 15 percent. Preferably, the relative humidity of the drying air used between syrup applications is less than about 8 percent.

The drying air may be passed over and admixed with the syrup coated gum centers in any way commonly known in the art. Preferably, the drying air is blown over and around the syrup coated gum centers at a flow rate, for large scale operations, of about 2800 cubic feet per minute. If lower quantities of material are being processed, or if smaller equipment is used, lower flow rates would be used. If a flavor is applied after a syrup coating has been dried, the present invention contemplates drying the flavor with or without the use of a drying medium.

By way of example and not limitation examples of the present invention will now be given.

In Examples 1-6 below, a Robatech model Concept 8 hotmelt unit was used to melt the xylitol for the purpose of applying the xylitol as a coating. The xylitol was heated to 200° F. (+/−5° F.) and held less than 24 hours before use. The Robatech unit was outfitted with an atomizing spray head, which is heated to prevent clogging. Batch weights were 200 pounds of uncoated gum centers and the coater used was a conventional Draim 1200 coater.

In addition to coating with molten polyols, various xylitol and maltitol syrups were used as coating substances. These syrups were also applied by spraying, but were sprayed with the standard spray equipment mounted on the Driam coater.

The weight of the uncoated gum centers was 1.0 gram and the target weight of finished pellets was 1.52 grams, including final polishing. Syrup brix was measured with a refractometer.

In Examples 7 and 8 below, different equipment was utilized. A Robatech model Concept 8 hotmelt unit was used to melt the xylitol for the purpose of applying the xylitol as a coating. The xylitol was heated to 200° F. (+/−5° F.) and held less than 24 hours before use. The coater used was a conventional 500 lb. Latini pan coater outfitted with a Thomas Engineering spray arm with heated atomizing nozzles. The polyol was constantly recirculated through the spray arm, which has a jacket that is heated with 220° F. water. The air used to dry the syrup-coated gum centers was between 12% and 15% relative humidity, and introduced to the Latini coater at 1800-2000 CFM.

In Examples 7 and 8 below, a small amount of titanium dioxide (<1%) was added to the molten xylitol in an effort to make the spray more fine and provide smoother finished pellets.

EXAMPLE 1

In this example, gum pellets were coated with molten xylitol. A pure xylitol was first melted. After spraying for 6 to 7 minutes, the coating on the pellets was 60% complete with a total pellet weight of approximately 1.3 g. The pellets were allowed to cool while the coater continued to tumble for about 2 minutes. The coated gum pellets appeared rough.

EXAMPLE 2

In this example, molten-xylitol-coated gum pellets were additionally coated with a xylitol syrup (high tahla content) with conventional panning. Molten-xylitol-coated pellets as described in Example 1 were coated to a weight of 1.52 grams with a xylitol syrup having the formula of 18% Water
63% Xylitol
18% Gum Tahla Solution (60% water/40% Tahla)
0.8% Titanium Dioxide (Brix 70-72)

The final coated product appeared rough. The total coating time was one hour fifteen minutes. Coating with syrup consisted of several cycles alternating between syrup application, pausing, and drying.

EXAMPLE 3

In this example, molten-xylitol-coated gum pellets were additionally coated with a xylitol syrup (reduced tahla content). Molten-xylitol-coated pellets as described in Example 1 were coated with a xylitol syrup having the formula of

| |
|---|
| 26% Water |
| 66% Xylitol |
| 7% Gum Tahla Solution (60% water/40% Tahla) |
| 0.5% Titanium Dioxide |

(Brix 68-70)

The final coated product appeared rough. Additionally, application of the thinner xylitol syrup caused partial washing-off of the molten-xylitol pre-coating. The total coating time was one hour thirty minutes. Coating with syrup consisted of several cycles alternating between syrup application, pausing, and drying.

EXAMPLE 4

In this example, gum pellets coated with molten xylitol were coated with maltitol syrup. Molten-xylitol-coated pellets as described in Example 1 were coated with a maltitol syrup having the formula of

| |
|---|
| 18% Water |
| 63% Maltitol |
| 18% Gum Tahla Solution (60% water/40% Tahla) |
| 0.8% Titanium Dioxide |

(Brix 70-72)

The maltitol syrup did not fill all the cavities on the pellet surfaces. The total coating time was one hour and thirty minutes. Coating with syrup consisted of several cycles alternating between syrup application, pausing, and drying.

EXAMPLE 5

In this example, gum pellets coated with molten xylitol were coated with an alternative maltitol syrup formulation. Molten-xylitol coated pellets as described in Example 1 were coated with a maltitol syrup having the formula of

| |
|---|
| 26% Water |
| 66% Maltitol |
| 7% Gum Tahla Solution (60% water/40% Tahla) |
| 0.5% Titanium Dioxide |

(Brix 68-70)

Coating with syrup consisted of several cycles alternating between syrup application, pausing, and drying. The maltitol syrup washed away the xylitol coating and the trial was not successful.

EXAMPLE 6

In this example, gum pellets were coated with a maltitol syrup, followed by molten xylitol, followed by a second maltitol syrup. Gum pellets were first coated with a thin coat (0.02-0.03 grams) with a maltitol syrup having the formula of

| |
|---|
| 18% Water |
| 63% Maltitol |
| 18% Gum Tahla Solution (60% water/40% Tahla) |
| 0.8% Titanium Dioxide |

(Brix 70-72)

followed by a 50% coating (0.25 grams) of molten xylitol. A final coating of maltitol syrups alternating between the following was applied:

1)

| |
|---|
| 18% Water |
| 63% Maltitol |
| 18% Gum Tahla Solution (60% water/40% Tahla) |
| 0.8% Titanium Dioxide |

(Brix 70-72)

2)

| |
|---|
| 26% Water |
| 66% Maltitol |
| 7% Gum Tahla Solution (60% water/40% Tahla) |
| 0.5% Titanium Dioxide |

(Brix 68-70)

The final product, with a weight of 1.52 grams, appeared acceptable. The total coating time was one hours and twenty-five minutes. Coating with syrup consisted of several cycles alternating between syrup application, pausing, and drying.

EXAMPLE 7

In this example, gum pellets were coated in a Latini coater first with molten xylitol followed by coating with xylitol syrup. Pellets pre-coated to 1.3 grams (0.3 grams of molten xylitol coating) were then coated with a xylitol syrup having the formula of:

| |
|---|
| 18% Water |
| 63% Xylitol |
| 18% Gum Tahla Solution (60% water/40% Tahla) |
| 0.8% Titanium Dioxide |

(Brix 70-72)

Coating with syrup consisted of several cycles alternating between syrup application, pausing, and drying. The total coating time was one hour and fifteen minutes. The final coated pellets, with a weight of 1.52 grams, appeared acceptable, and the addition of titanium dioxide to the molten xylitol resulted in the smoothest pellet surface yet.

EXAMPLE 8

In this example, gum pellets were coated sequentially with xylitol syrup by conventional panning, molten xylitol, and xylitol syrup. Gum pellets were coated with a xylitol syrup having the formula of

| |
|---|
| 18% Water |
| 63% Xylitol |
| 18% Gum Tahla Solution (60% water/40% Tahla) |
| 0.8% Titanium Dioxide |

(Brix 70-72)

The gum centers were pre-coated with syrup for 15-20 minutes, until they reached a weight of 1.05 to 1.1 grams. Coating consisted of several cycles alternating between syrup application, pausing, and drying.

Molten xylitol was then applied for 10 minutes, until the gum centers reached a weight of 1.35 grams to 1.4 grams.

Thereafter, a final coating was applied using a reduced viscosity xylitol syrup having the formula of

| |
|---|
| 18% Water |
| 63% Xylitol |
| 18% Gum Tahla Solution (60% water/40% Tahla) |
| 0.8% Titanium Dioxide |

(Brix 68-70)

Coating with syrup consisted of several cycles alternating between syrup application, pausing, and drying. This final coat took approximately 45 minutes, alternating between syrup application, pausing, and drying. The total coating time was one hour fifteen minutes. The final coated pellets appeared very smooth, but many had rounded corners due to the low viscosity xylitol syrup.

EXAMPLE 9

In this example, spraying gum centers with molten maltitol was attempted. Unlike molten xylitol, molten maltitol spray produced spider web-like structures rather than a mist of spray, probably due to the high melting point of the maltitol. When the molten maltitol solution exited from the nozzle, it immediately solidified and turned into cotton candy-like threads, therefore, not adhering to the centers. This problem was alleviated by adding an inorganic filler (titanium dioxide) to the molten maltitol.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of manufacturing a confectionary product comprising the steps of:
   providing a confectionary center;
   heating at least one polyol to at least the one polyol's melting point to produce a molten polyol;
   coating the confectionary center in a coating step with at least one layer of the molten polyol, wherein the coating comprises less than 5 percent by weight water during the coating step, and wherein the coating step is performed by atomizing the molten polyol and spraying the confectionery center.

2. The method of claim 1, wherein the polyol is selected from the group consisting of xylitol, maltitol, sorbitol, erythritol, mannitol, isomalt, lactitol and combinations thereof.

3. A method of manufacturing a chewing gum comprising the steps of:
   forming a chewing gum center that includes a water soluble portion and a water insoluble portion;
   liquefying at least one poiyoi by heating a poiyoi composition that includes not more than 5% by weight water to produce a molten polyol; and
   coating the chewing gum center by atomizing the polyol and spraying the molten poiyoi on the chewing gum center.

4. The method of claim 3, wherein the method does not include the step of heating the coated center to dry the coating.

5. The method of claim 3, wherein the molten polyol is applied directly to the chewing gum center.

6. The method of claim 3, wherein the final weight of the coating exceeds 50% of the weight of the uncoated chewing gum center.

7. The method of claim 3, wherein the polyol is selected from the group consisting of xylitol, maltitol, sorbitol, erythritol, mannitol, isomalt, lactitol and combinations thereof.

8. The method of claim 3, wherein xylitol is the only polyol contained in the coating.

9. The method of claim 3, wherein the molten polyol coating includes a non-polyol ingredient.

10. The method of claim 9 wherein the non-polyol ingredient is chosen from the group consisting of titanium dioxide, calcium carbonate, silicon dioxide, and talc.

11. A method of manufacturing a chewing gum comprising the steps of:
    forming a chewing gum center that includes a water soluble portion and a water insoluble portion;
    coating a molten polyol onto the chewing gum center with a first coating comprising a molten polyol, wherein the first coating is preformed by atomizing the molten polyol and spraying the confectionery center; and
    coating the first coating with a second coating selected from the group consisting of molten polyol, polyol syrup, sugar syrup and combinations thereof.

12. The method of claim 11, wherein the first coating is applied directly to the chewing gum center.

13. The method of claim 11 wherein the final weight of the first coating exceeds 50% of the weight of the uncoated chewing gum center.

14. The method of claim 11, wherein the molten polyol of either the first or the second coating is selected from the group consisting of xylitol, maltitol, sorbitol, erythritol, mannitol, isomalt, lactitol and combinations thereof.

15. The method of claim 11, wherein the polyol syrup contains a polyol selected from the group consisting of xylitol, maltitol, sorbitol, erythritol, mannitol, isomalt, lactitol and combinations thereof.

16. The method of claim 11, wherein the molten polyol of either the first or the second coating includes a non-polyol ingredient.

17. The method of claim 16, wherein the non-polyol ingredient is chosen from the group consisting of titanium dioxide, calcium carbonate, silicon dioxide, and talc.

18. A method of manufacturing a chewing gum comprising the steps of:

producing a chewing gum center that includes a water soluble portion and a water insoluble portion;

atomizing and spraying a coating on the chewing gum center, the coating comprising a molten polyol; and wherein the method does not include the application of heat to dry the coated chewing gum center.

19. The method of claim 18, wherein the polyol is selected from the group consisting of xylitol, maltitol, sorbitol, erythritol, mannitol, isomalt, lactitol and combinations thereof.

20. The method of claim 18, wherein the molten polyol coating is atomized and sprayed over a previously applied coating that was applied around the gum center while in a non-molten state.

21. The method of claim 20, wherein the previously applied coating is selected from the group consisting of polyol syrup, sugar syrup and combinations thereof.

22. A method of manufacturing a chewing gum comprising the steps of:

forming a chewing gum center that includes a water soluble portion and a water insoluble portion;

liquefying at least one polyol and at least one non-polyol by heating a composition that includes not more than 5% water and the polyol and non-polyol to produce a molten polyol; and coating the chewing gum center by atomizing the composition and spraying the composition on the chewing gum center.

23. The method of claim 22 wherein the non-polyol ingredient is chosen from the group consisting of titanium dioxide, calcium carbonate, silicon dioxide, and talc.

* * * * *